Oct. 6, 1942.   H. C. POLLITZ   2,298,160
PORTABLE MIXING PLANT
Filed Sept. 23, 1940   5 Sheets-Sheet 1
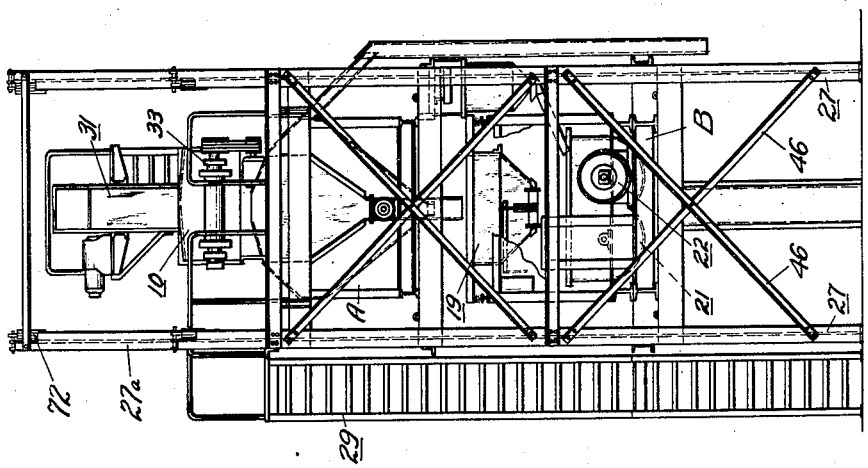
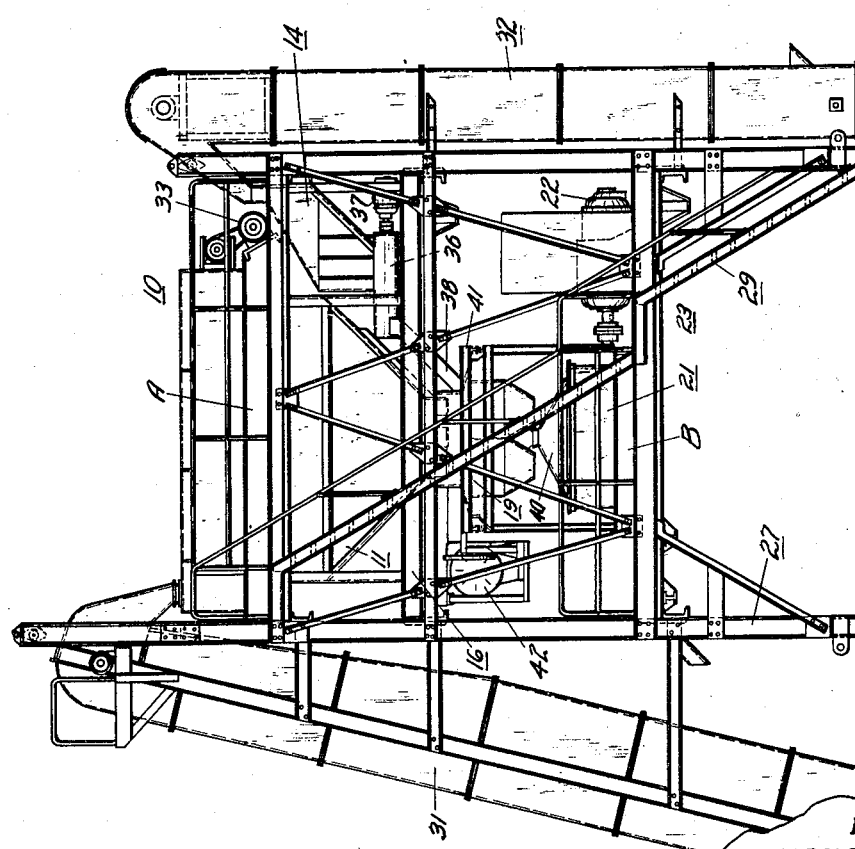
INVENTOR.
HAROLD C. POLLITZ
BY
Flournoy Corey
ATTORNEY.

Oct. 6, 1942.　　　H. C. POLLITZ　　　2,298,160
PORTABLE MIXING PLANT
Filed Sept. 23, 1940　　　5 Sheets-Sheet 2
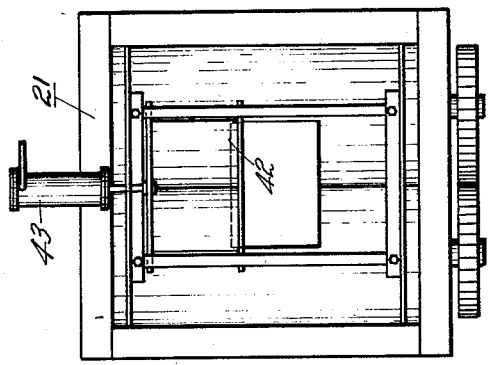
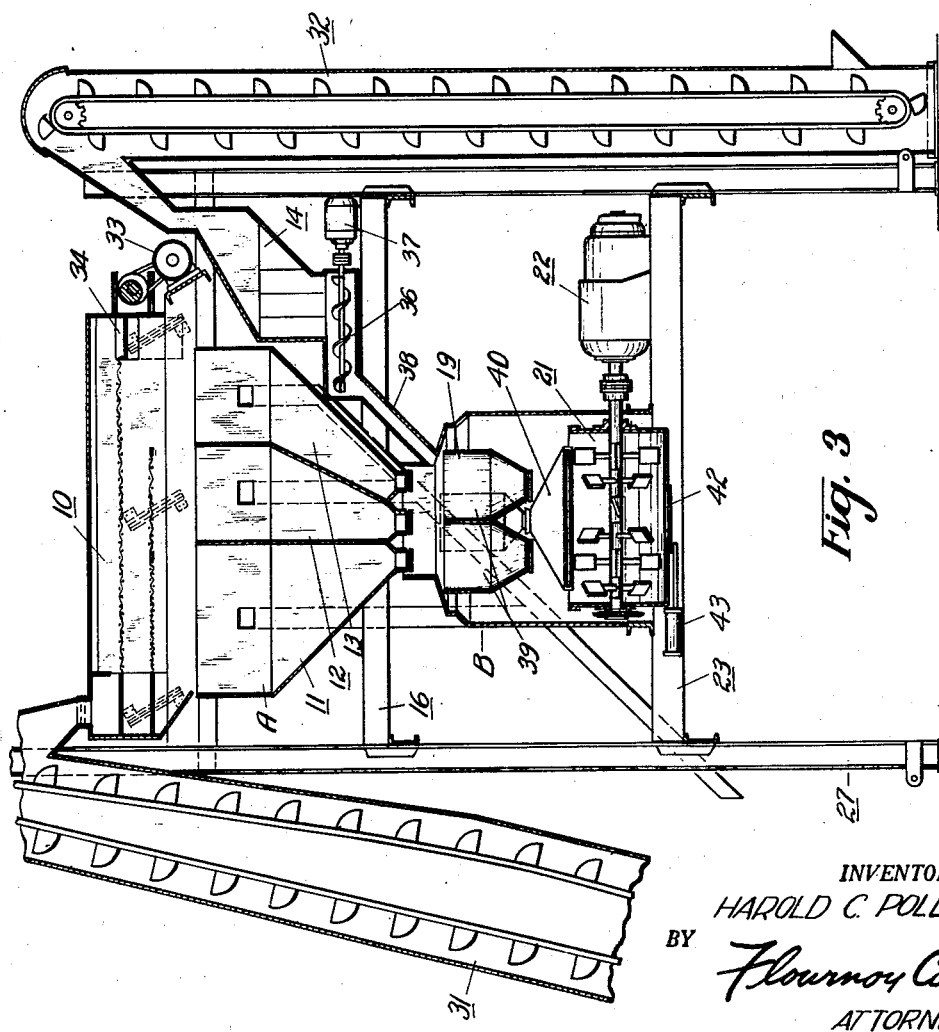
INVENTOR.
HAROLD C. POLLITZ
BY
Flournoy Corey
ATTORNEY

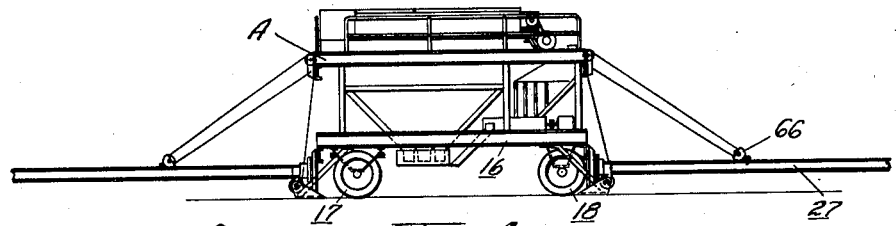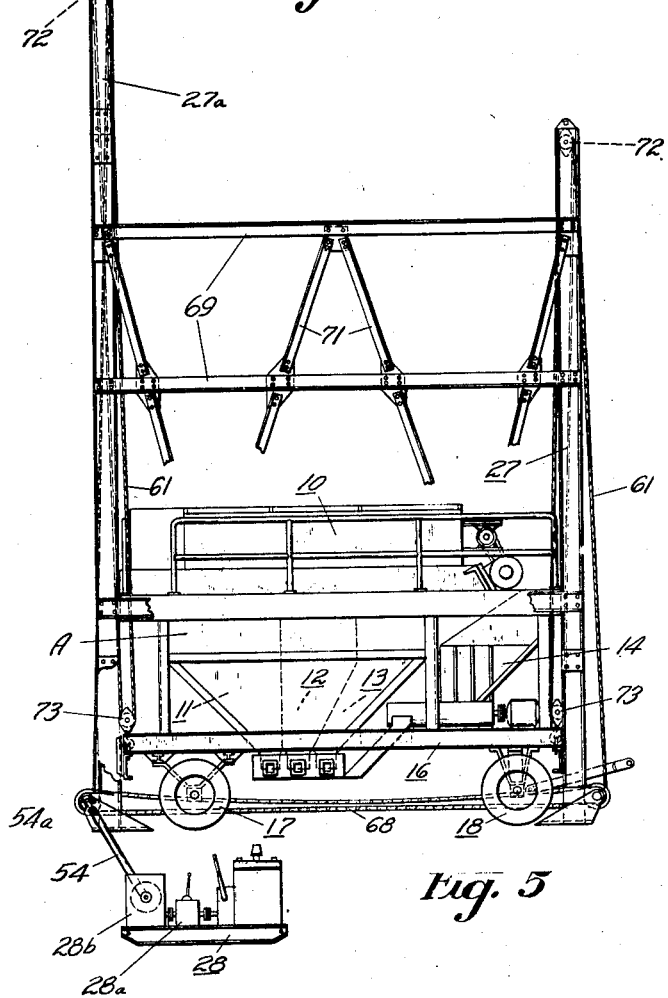

Oct. 6, 1942.  H. C. POLLITZ  2,298,160
PORTABLE MIXING PLANT
Filed Sept. 23, 1940   5 Sheets-Sheet 4
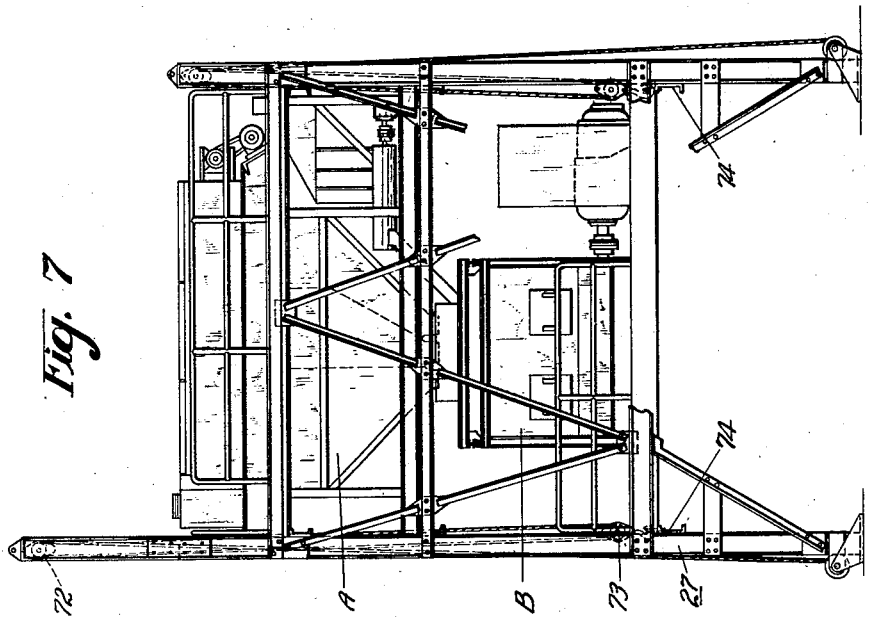
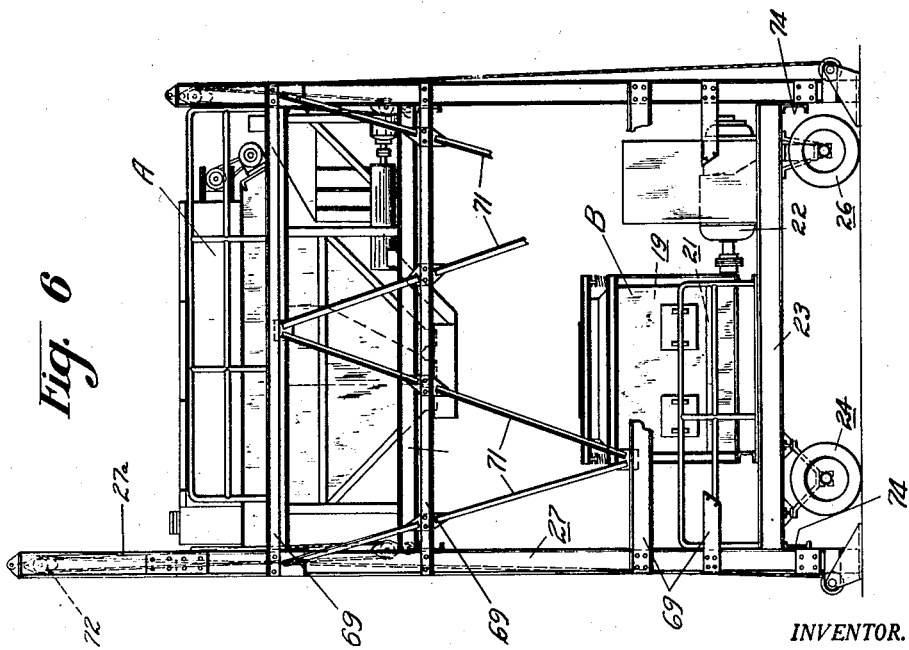
INVENTOR.
HAROLD C. POLLITZ
BY Flournoy Corey
ATTORNEY.

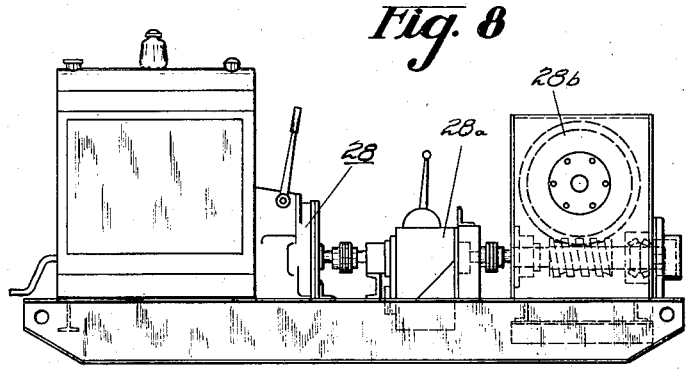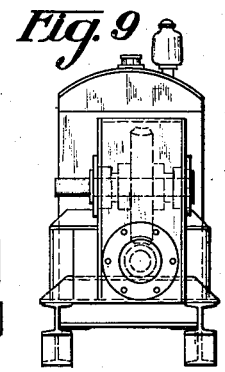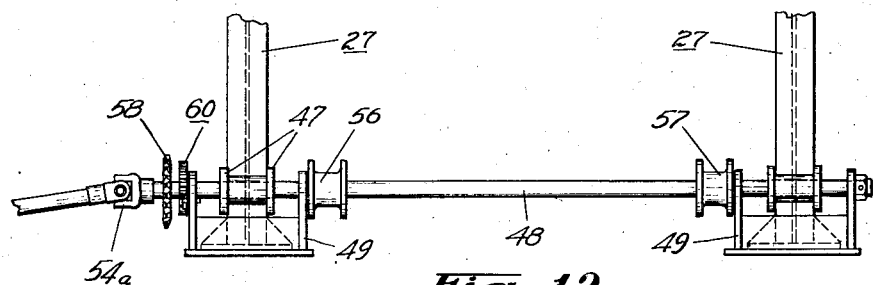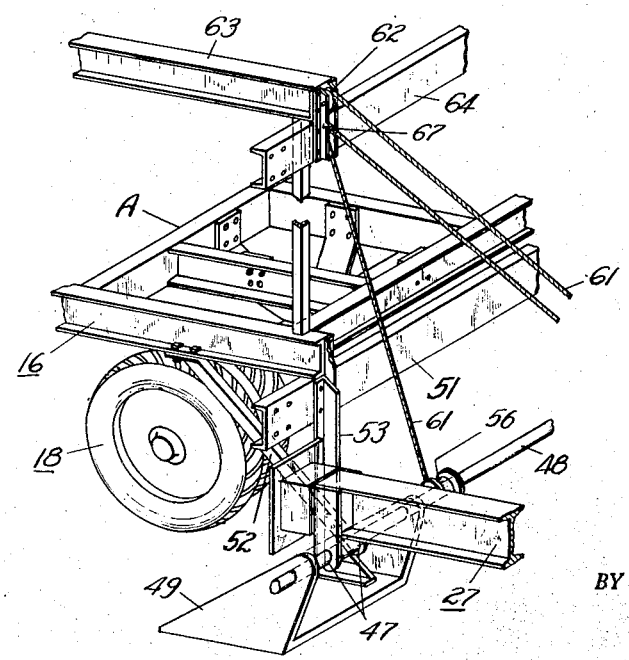

Patented Oct. 6, 1942

2,298,160

UNITED STATES PATENT OFFICE 2,298,160

PORTABLE MIXING PLANT

Harold C. Pollitz, Cedar Rapids, Iowa, assignor to Iowa Manufacturing Company, Cedar Rapids, Iowa, a corporation of Iowa Application September 23, 1940, Serial No. 357,881

14 Claims. (Cl. 259—153)

This invention relates to asphalt plants and has particular relation to a means for and method of transporting, erecting and dismantling asphalt plants and like structures.

In building roads, highways, airports and the like, it is frequently found expedient to utilize crushed rock, gravel and the like mixed and bound with an asphalt or oil binder for the road surface.

In order to secure minimum costs per yard of mixed road material, it is becoming the practice to utilize larger and still larger mixing plants so that increased tonnage for a given amount of labor and other overhead may be secured. However, it is necessary to move these plants about from place to place at times, and as the plants become larger, the cost of transporting, erecting and tearing down large heavy plants becomes so high that the cost per yard of mixed material is increased. The expense of moving a plant becomes higher as the size of the plant increases, especially when the volume of mixed material is low.

Mixing plants of the character here considered generally consist of a tower, grading screens positioned at the top of the tower, bins in which the various sizes of aggregate from the screen are stored, mounted, of course, just below the screens, a weighing and batching mechanism below the storage bins or hoppers, and a pug mill in which aggregate is mixed with the oil, asphalt or the like used as a binding material.

In the large plant here considered, the tower is sufficiently high that an opening is provided beneath the pug mill so that the mixed material may be discharged directly into a wagon or truck. An elevator is provided for raising the crushed rock to the screen. In the device here shown, means are provided for introducing sand or dust into the mixture, and a second elevator is utilized for raising this sand or dust to the top of the tower.

It is one of the broad general objects of my invention to provide means whereby the transportation, erection and tearing down of a plant is materially expedited and in which these operations may be carried out in a minimum of time, and at a minimum of expense for labor, and with a minimum of auxiliary equipment.

Another general object of my invention is to provide means for combining various units and rendering them mobile and at the same time provide means for integrating the units into a mixing plant.

Another object of my invention is to provide means for erecting and dismantling a tower and raising the various units of the plant into place in the tower and lowering them therefrom.

Still another object of my invention is to provide means for properly locating the corner posts of a mixing plant tower during erection and dismantling of the tower.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in side elevation of a substantially complete asphalt mixing plant as it appears after erection thereof according to my means and method of erection.

Figure 2 is a view in end elevation of the plant shown in Figure 1 taken from the right side of Figure 1, but with the elevator and other parts removed or partly broken away to better illustrate the parts of the plant.

Figure 3 is a more or less schematic diagram illustrating the various mechanisms for elevating the crushed rock and dust, for grading the crushed rock, and for mixing the crushed rock with asphalt, oil or the like, and this view is substantially the same as that shown in Figure 1 but with the walls of the various parts removed to better illustrate the interior structure.

Figure 4 is a view in side elevation of a trailer mounted grading and storage unit, together with means for erecting a tower and mounting the unit in the tower. The illustration shows the tower unit in place ready for erection, before erection is started.

Figure 5 is a view in side elevation of the unit shown in Figure 4, but with the tower erected and with the mechanism disposed for raising the screen and storage bins into place at the top of the tower.

Figure 6 shows the screen and storage bins raised to their places in the tower structure, and a mixing mill or pug mill transporting unit wheeled into place in the tower and ready for raising the pug mill to position.

Figure 7 illustrates the tower with the pug mill raised to its proper position ready for use.

Figure 8 illustrates the motor driven reduction gearing employed for erecting the tower structure and raising the various parts of the mixing plant into place.

Figure 9 is a view in end elevation of the unit shown in Figure 8.

Figure 10 is supplementary to Figure 4 and is a fragmentary view in perspective illustrating, in enlarged detail the relation of the trailer unit, the tower parts and the tower erecting means just before erection of the tower is begun.

Figure 11 is a bottom view of the pug mill, shown in Figure 3 illustrating the means for dumping the mixed material from the mill.

Figure 12 is a fragmentary view of the tower, pedestals, and the winches and shafting used in erecting the tower and raising and lowering the mixing plant units.

Referring now to the drawings:

In practicing my invention I preferably divide the asphalt plant into two main units, both of which units may be transported as four-wheel trailers and one of which units is provided with means for positioning and guiding the columns of the tower during erection and dismantling of the plant. This last named unit, which I have indicated generally by the letter A (Figures 1 and 3), preferably consists of a grading device or separating screen, indicated generally at 10, aggregate bins indicated generally at 11, 12 and 13, and the dust bin 14. These members are mounted on a common chassis or frame 16, which is supported by means of trailer wheels 17 and 18 (Figure 4).

The second mobile unit which I have designated by the letter B, including a single unit incorporating the weighing and batching mechanism 19, the pug mill, illustrated generally at 21, and an electric motor and reduction gear or other power means for driving the pug mill, illustrated at 22. These last named units are mounted on a common framework 23, which is in turn mounted on trailer wheels 24 and 26 (Figure 6).

The tower structure 27, the winch driving unit 28, the stairway 29, the aggregate elevator 31, and the dust elevator 32 are transported on one or more trucks or trailers as auxiliary parts.

In order to better understand the means for erecting and dismantling mixing plants, the units of which are constructed more or less according to usual practice, it is considered desirable that the operation of the completed plant be first explained. In this explanation reference may be had more particularly to Figures 1, 2 and 3.

In operating the plant, crushed rock aggregate and the like is raised to the top of the tower by means of the elevator 31. The elevator discharges into the hopper end of the aggregate classifying device or screen 10. The device 10 here shown is provided with three screens of different mesh driven by the electric motor 33, which separates the aggregate into three different sizes, which are deposited in the bins 11, 12 and 13. Aggregate too large to pass through any of the screens is rejected through the trough 34, all in accordance with the usual practice.

Dust or sand is elevated by means of the elevator 32, and discharged into the dust bin 14. The rate of flow of the dust or sand from the dust bin or hopper is controlled by the screw conveyer 36, driven by motor and reduction gearing 37. The material discharged from the screw conveyer 36 passes down the chute 38, and into the hoppers 39 of the weighing and batching mechanism. The hoppers 39 of the weighing and batching mechanism are suspended by a spring mounted framework 41, and the weight of the material in the hoppers is measured by means of the scales 42.

In use, materials from the various bins are permitted to flow into the hoppers 39 in quantities as desired, in accordance with the usual practice, and when the desired weight of a given batch has been secured, the outlets of the batching hoppers 39 are opened, and the materials are permitted to drop down into the pugmill 21. A measured amount of oil, or asphalt, or the like, is discharged into the pugmill 21 through the flared nozzle 40, and the material is thoroughly mixed to coat all the particles of aggregate with oil or asphalt. When mixing has been completed the discharge gate 42 of the pugmill is opened by means of the hydraulic, steam or pneumatic cylinder 43, and the mixed material is permitted to drop into a wagon box, or truck box, or the like, for transporting it to the paving job.

It is quite apparent that, in order to secure maximum production of mixed material, the various units, such as the screen, the bin, the weighing and batching mechanism, the pug mill, and the conveyers, must be large and heavy, therefore transporting and erecting of the mixing plant is a considerable problem, and it is to this problem that my invention is chiefly directed. In solving this problem and providing for the quick and efficient erection and dismantling of mixing plants, I provide means whereby one of the trailers, that is, the trailer carrying the screen and the hoppers, is utilized not only as a means for locating the corner posts of the tower during erection and dismantling thereof, but in which this trailer also acts to provide a tower from which lines may be rigged for pulling up the corner columns of the tower, and also as a locating means for the winches employed in winding and unwinding the cables or lines used in erecting the tower. Means are provided for synchronizing the movement of the parts of the tower and of the various units of the mixing plant as they are raised into place and lowered to the ground.

For an understanding of the structure utilized in erecting and dismantling the mixing plant and for an understanding of the various steps in this procedure, reference may be had to Figures 4 to 11 inclusive.

In Figure 4 I have illustrated how the A trailer unit is arranged for erecting the mixing plant tower. Figure 10 illustrates, in enlarged detail, the structure by which the corner posts 27 of the tower are anchored for pivotal movement during erection and how the posts are guided during erection so that they are properly spaced when erected.

Figure 10 also illustrates how the A trailer unit is utilized as a tower for erecting the corner posts or end frames of the tower. The end corner posts or columns 27 are preferably joined by cross braces 46 before erection. The lower end of each of these corner posts is provided with a pair of ears 47, which are pivotally received on a cross shaft 48. The cross shaft 48 is in turn rotatably mounted in heavy brackets 49. These heavy brackets 49 rest upon the ground and are spaced from the frame members 16 and 51 of the A trailer by means of braces 52 and 53. The position of the brackets 49 and hence of the columns 27 is thus accurately determined with reference to the frame members 16 and 51 of the A trailer, and when the corner columns 27 have been swung up into place they will be properly spaced with reference to the A trailer so that the entire trailer, with the exception of the wheels, may be hoisted into its proper place within the tower.

Hoisting of the corner columns into place is accomplished by means of the power unit 28, which is adapted to drive shaft 54 forward and reverse through power reduction units 28a and 28b to thus rotate the shaft 48 in one direction or the other as desired. The drive shaft 54 is provided with universal joints 54a so that the power unit 28 need not be in direct alignment with the shaft 48.

The shaft 48 carries a pair of winding drums 56 and 57 and a sprocket 58 thereon. Similar cables 61 are wrapped around each of winding drums 56 and 57, and the cables extend upwardly and over pulleys 62 on the upper frame members 63 and 64 of the A trailer unit, down to blocks 66 on the corner column members 27, and back to dead ends indicated at 67 on the frame member 64. A ratchet wheel mounted on the cross shaft 48 and a ratchet pawl mounted on one of the base brackets 49 are indicated generally at 60 and prevent reverse rotation of the shaft 48 and dropping of any part or unit after that part has been hoisted into place or during the hoisting. This constitutes a safety feature to prevent dropping of the load.

The brackets or pedestals 49 and the shafts 48 and winding drums 56 and 57 are identical on the opposite ends of the A trailer, and the sprockets 58 are connected by means of a chain 68 so that the shafts 48 on the opposite ends of the A unit may be rotated synchronously so that the columns of the opposite ends of the tower and the opposite ends of the A and B units may be raised and lowered simultaneously.

The opposite ends of the tower may be raised simultaneously or one side at a time as desired. When the ends of the tower have been raised into place, they are joined by means of cross members 69 and braces 71, and are bolted into place to stiffen the structure; thus a stiff tower-like support is provided for the various units which make up the mixing plant. The columns 27 at the left end of the plant may be surmounted by shorter columns 27a, which thus afford a raised portion of the structure better adapted for raising the heavy elevator 31, the stairway 29 and other parts into place.

After the tower has been formed, the trailer unit A is hoisted into place as illustrated in Figure 5 by training the cables 61 over pulleys 72 at the tops of the columns 27, down to the blocks 73 on the four corners at opposite ends on the frame 16 and back to dead ends at pulleys 72. The entire A unit with the exception of the wheels and the wheel bolsters may then be raised into its place in the tower by rotating shafts 48, as illustrated in Figures 1, 2, 3, 6 and 7.

The frame members 51 and 64 rest against the sides of the columns 27 and serve, with the members 16 and 63, to prevent the units from swinging to too great an extent within the tower. When the unit has been raised into place, the ends of the members 51 and 64 are bolted to their respective columns 27 and the unit is thus secured within the tower. The wheels 17 and 18 and the bolsters are disconnected as the unit is being raised into place, and rolled away.

The B unit is then rolled into place within the tower by removing some of the lower end braces 46, as illustrated in Figure 6, and this unit may likewise be raised into place as illustrated in Figure 7 by employing the blocks 73 and cables 61. When it has been raised into place the frame members 74, which join the side frame members 23 of unit B, are likewise bolted to columns 27 to thus support the B unit in raised position shown in Figure 7.

The auxiliary parts of the plant, such as the aggregate elevator 31, the dust elevator 32, the stairway 29 and the like, may also be quickly raised into place by means of the blocks and tackle used in raising the tower and the A and B units.

When these parts have been raised into place, they may be readily bolted and secured to prepared fastenings on the tower. It is only necessary to connect up the wiring for the motors and the piping and the like to make the plant ready for operation. The plant may be torn down by reversing the process just described.

It is apparent that by my invention the location and erection of the tower is materially simplified and raising the various units of the plant into place is expedited.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a material mixing plant including mobile units, a tower, and corner members for the tower, means including a frame on one of the mobile units for spacing the bases of the corner members of the tower, said means including pivotal connections with the spacing means, about which pivotal connections the corner members are rotatable for erection, shafts through the pivotal connections having sheaves thereon, means for driving the shafts, and cables adapted to be wound and unwound on the sheaves and to be utilized in erecting and dismantling the tower.

2. In a portable material mixing and handling plant, a plurality of mobile units adapted for associated use as a single plant, a superstructure including at least four corner columns, means associated with one of the mobile units for hoisting said columns, other means for positioning and pivotally supporting the said columns at their lower ends while they are being hoisted, lateral tie and bracing members for completing the superstructure, and means including the first mentioned hoisting means for hoisting the mobile units to positions above the ground and within the superstructure.

3. In a portable, material mixing and handling plant, a plurality of mobile units, means for constructing a tower around one of said units, said means including means for pivotally supporting the lower ends of the corner posts of said tower, means for bracing the pivotal supporting members relative to the last mentioned unit, hoisting means for swinging the corner posts upwardly about the pivotal supporting means, structural members for completing the tower, and means including the said hoisting means for hoisting the units to operative positions within the tower and guided by the corner posts.

4. In a portable material mixing and handling plant including a plurality of mobile units and a tower, including corner posts, for supporting the units above the ground, means co-operating with one unit adapted for use in hoisting and erecting the parts of the tower, said means including means for pivotally supporting the corner posts at their lower ends, cable means connected with the last mentioned unit, a hoisting drum for raising the corner posts about their pivotal supporting means, other frame members for completing the tower, and means, including the cable means, for hoisting the mobile units to operative positions within the tower.

5. In a semi-portable, material mixing and handling plant, at least one mobile unit having a frame, at least four corner posts for the construction of a tower, a ground engaging bracket member for each corner post, means pivotally securing each post at the lower end thereof to a bracket, cross members on the frame, attaching and bracing means for positioning and securing the bracket members below the corners of the frame in such position that when swung to a vertical position around their respective pivotal means, the corner posts will be positioned closely adjacent the cross members, whereby the corner posts may serve as guides for vertical movement of the frame, and means including cables operatively connected with the frame of the mobile unit at the top thereof for swinging the corner posts upwardly about their pivotal points.

6. In a semi-portable mixing plant, a plurality of mobile units having removable wheels, at least four corner posts for the construction of a tower, a frame on one of the mobile units, bracket means, adapted to be detachably connected to the said frame adjacent the corners thereof and close to the ground surface, a cross shaft extending between the brackets on each end of the frame for pivotally securing the corner posts, at the lower ends thereof, to the brackets, hoisting means including winding drums on the cross shafts and cables extending between pulleys on the upper part of the frame and the corner posts for raising the said corner posts, other framing members for completing a tower about the four corner posts, means including the said cables, said winding drums and sheaves secured to the upper ends of the corner posts for lifting the units upwardly within the frame, the frames of the units having means relatively slidable with the corner posts for guiding the units as they are lifted, and means for securing the said guiding means to the corner posts at spaced distances above the bottom of the tower.

7. In a portable mixing plant, including a tower and the plant being divided into a plurality of mobile units each mounted as a vehicle for mobility, means on one of said units for guiding and positioning the parts of the tower during erection thereof, and means on one of the vehicles for spacing apart the corner members of the tower and affording pivots for securing the lower ends of the corner members during erection thereof.

8. In a portable mixing plant, including a tower and the plant being divided into a plurality of mobile units each mounted as a vehicle for mobility, means on one of said units for guiding and positioning the parts of the tower during erection thereof, affording fixed pivots spaced by one of the vehicles about which the corner members of the tower may pivot during erection, hoisting cable and means including winding drums disposed co-axial with the pivots for winding up the hoisting cable in erection of the corner posts and other parts of the tower.

9. In a material mixing plant including a tower having corner posts with pivotal connections for supporting assembled units of the mixing plant and vehicles for transporting assembled units of the mixing plant, means on one of the vehicles for erecting the tower and for guiding the corner posts thereof during erection, and means, including shafts and sheaves associated with the pivotal connections, for winding and unwinding cables used in erection of said tower.

10. In a portable material mixing plant including a tower having corner members, and a plurality of substantially assembled units, to be engaged to and supported in the tower when the plant is in use, means for raising and lowering units of the plant in the tower including a pair of shafts rotatably engaged to the base of the corner members of the tower, and means for synchronizing rotation of the shafts to cause simultaneous raising and lowering of the corner members of the units within the tower.

11. A portable mixing plant including a tower structure having corner posts adapted to be raised in an arc from the ground, the mixing plant being divided into at least two units, one of the units having a spacing means to determine the pivot points and arcs of travel of the corner posts during erection thereof, the unit also having other means for lifting, guiding and positioning the corner posts and other parts of the tower during erection.

12. In a mixing plant of the class described, a knock-down tower for supporting a unit of the plant in spaced relation above the ground, the tower including corner posts adapted to be raised and lowered between horizontal and vertical position so the posts may be transported in horizontal position as individual parts and erected and secured to one another by cross beams to form a tower, means for erecting the corner posts and guiding them during erection to insure proper spacing thereof including braces on the plant unit having detachable pivotal connections with the lower ends of the corner posts to provide pivot points about which the corner posts rotate during erection, the braces being at such length to insure that the posts will be in properly spaced position about the unit when erected so that the unit may be raised within the tower, and the unit having a frame in spaced relation above the braces which frame may be used as an anchor for block and tackle for raising the corner posts and for a spacing means to determine the end position of the corner posts after erection, and for cross braces for the tower after the unit has been raised into place.

13. In a mixing plant divided into several units for ready transportation, means for erecting a tower having corner posts including means on one unit for spacing the corner posts during erection whereby, when the tower is erected, the spacing between the corner posts is sufficient to permit other of the units to be moved into the base and vertically upward within the confines of the base of the tower, and disposed in stacked relation within the tower, means for raising the successive units within the tower, successive units being inserted in the tower after the preceding unit has been raised.

14. In a mixing plant divided into several units for ready transportation, the units being so constructed and arranged that they may be disposed one above another in use, means on one of said units for erecting a tower having corner posts, said means including means for spacing the corner posts during erection so that, when erected, the spacing between the corner posts is sufficient to permit the units to be successively inserted within the base of the tower and lifted vertically upward within the tower and disposed in stacked relation within the tower, means for raising the successive units within the tower, successive units being inserted in the tower after the preceding unit has been raised.

HAROLD C. POLLITZ.